United States Patent [19]

Nagashima et al.

[11] Patent Number: 5,408,282
[45] Date of Patent: Apr. 18, 1995

[54] PROJECTION SYSTEM FOR PROJECTION TV SET

[75] Inventors: Takashi Nagashima; Yukio Ozaki; Kazuya Akiyama; Takayuki Yoshioka; Naruhiko Atsuchi; Saori Wagatsuma, all of Tokyo, Japan

[73] Assignee: Pioneer Electronic Corporation, Tokyo, Japan

[21] Appl. No.: 68,965

[22] Filed: May 28, 1993

[30] Foreign Application Priority Data

Jun. 1, 1992 [JP] Japan ................... 4-165355
Jun. 1, 1992 [JP] Japan ................... 4-165356
Jun. 1, 1992 [JP] Japan ................... 4-165357
Jun. 15, 1992 [JP] Japan ................... 4-155454

[51] Int. Cl.$^6$ ............ G03B 21/28; G03B 21/10
[52] U.S. Cl. ........................... 353/77; 353/74; 359/456; 348/782
[58] Field of Search ........... 353/74, 76, 77, 78, 353/98, 119; 358/60, 64, 65, 66, 231, 237, 449; 359/457, 456, 455, 554, 460; 348/744, 776, 778, 782, 794

[56] References Cited

U.S. PATENT DOCUMENTS

| | | | |
|---|---|---|---|
| 4,439,027 | 3/1984 | Shioda et al. | 358/237 |
| 4,721,361 | 1/1988 | van de Veu | 359/457 |
| 4,730,211 | 3/1988 | Hasegawa | 358/60 |
| 4,804,884 | 2/1989 | Vriens et al. | 358/237 |
| 4,982,289 | 1/1991 | Mitani et al. | 358/231 |
| 5,223,869 | 6/1993 | Yanagi | 353/74 |

FOREIGN PATENT DOCUMENTS

| | | | |
|---|---|---|---|
| 57-109481 | 7/1982 | Japan | 358/60 |
| 59-015925 | 1/1984 | Japan | 359/457 |
| 61-013241 | 1/1986 | Japan | 359/457 |
| 63-110434 | 5/1988 | Japan | 359/457 |

Primary Examiner—William A. Cuchlinski, Jr.
Assistant Examiner—William C. Dowling
Attorney, Agent, or Firm—Kane, Dalsimer, Sullivan, Kurucz, Levy, Eisele and Richard

[57] ABSTRACT

A rear projection television set is disclosed which includes a screen assembly, a reflector mirror located behind the screen assembly, and a projection source having a lens system for projecting rays of light to a rear side of the screen assembly through the reflector mirror. The projection source is arranged below the reflector mirror. A ray of light emitted along an optical axis of the lens system of the projection source is reflected by the reflector mirror. A positional relationship among the screen assembly, the projection source and the reflector mirror is determined so that the reflected ray of light is incidental from an upper side to a lower side relative to the screen.

20 Claims, 15 Drawing Sheets 17  15  16

F I G. 20
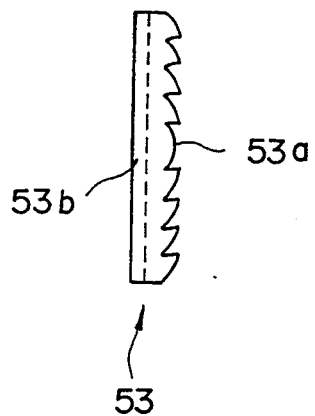
F I G. 21
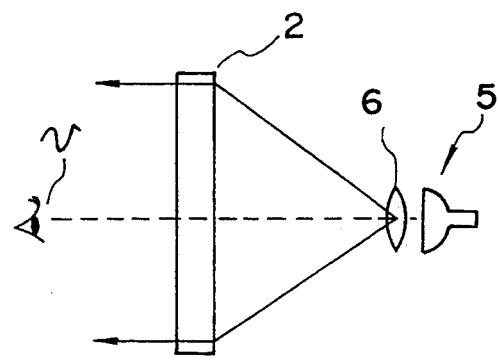
F I G. 22
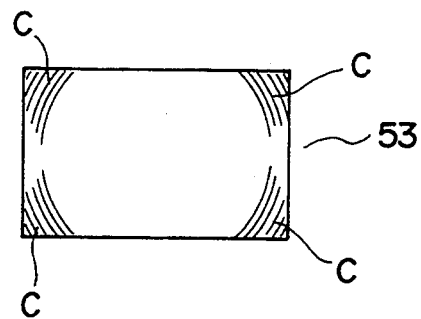

PROJECTION SYSTEM FOR PROJECTION TV SET

BACKGROUND OF THE INVENTION

The present invention relates to a rear projection television set in which a reflector mirror is provided behind a screen so that light from a projection source is projected through the reflector mirror to the rear side of the screen. Also, the present invention relates to a projection system which may be applied to a front projection television set as well as a rear projection television set in which performances such as overall brightness balance and color balance are well improved.

In general, in rear projection television sets, a projection source is provided in a lower portion of a casing, and light from the projection source is reflected by a reflector mirror so as to project the rear side of the screen. As shown in FIGS. 1 and 2, the rear projection television set has a casing 50. In a lower portion of the casing, there is provided a projection source 51 which is composed of a CRT unit 54 and a lens assembly 55. The light emitted from the projection source 51 is reflected by the reflector mirror 52 and is caused to pass through the screen 53 provided on a front face of the casing 50.

In such a rear projection television set, a ray of light 60 emitted from the projection source 51 along an optical axis will advance in a normal direction of the screen 53 or otherwise as shown in FIG. 2, will advance toward the screen 53 at an incident angle $\theta_0$ relative to the normal line $l_0$ of the screen from the lower side to the upper side. The incident angle $\theta_0$ is usually set at about 5°, for example. The reason why the ray of light 60 is caused to advance along the normal line of the screen 53 or at a slight incident angle from the lower side to the upper side is that the observer may feel the pictorial image bright.

The projection source 51 is provided to be slanted from the screen side of the depth of the casing 50 to the central portion so that a ray of light 61 directed to a lower edge of the screen 53 is prevented from being blocked or interrupted by the projection source 51. However, in order to receive the projection source 51 below the screen 53, a so-called skirted portion (i.e., a lower space) is provided in the casing 50.

In general, a center height To of the screen 53 depends upon a height of the eyes of the observer and an optical path within the casing 50. For instance, the center height To is in the range of about 850–1,000 mm. For this reason, if a rack is provided in the lower space of the casing 50 for connection with a VTR, a laser disc player and the like, the center height To is unduly increased which is not practical. As a result, additional equipment such as VTRs and laser disc players have to be installed in another place.

SUMMARY OF THE INVENTION

Accordingly, an object of the present invention is to provide a rear projection television set in which a "skirted portion" at a lower portion of a screen of the casing is made small as much as possible to decrease a height of a center of the screen.

Another object of the invention is to provide a projection television set which has a uniform brightness on an image field on a screen.

Still another object of the invention is to provide a projection system which can insure good performances such as brightness balance of an overall image field and color balance, in which the amounts of electrical compensation and magnetic compensation with external magnetic field may be small but an increased amount of heat generated in the system is small. A halo generation is also avoided.

According to the present invention there is provided a rear projection television set including a screen, a reflector mirror located behind the screen, and a projection source having a lens system for projecting rays of light to a rear side of the screen through the reflector mirror. The rear projection television set is characterized in that the projection source is arranged below the reflector mirror, a ray of light emitted along an optical axis of the lens system of the projection source is reflected by the reflector mirror, and a positional relationship among the screen, the projection source and the reflector mirror is determined so that the reflected ray of light is incidental from an upper side to a lower side relative to the screen.

The projection source is arranged substantially in parallel to the screen.

An incident point of the reflected ray of light to the screen is located above a center of the screen.

The lens system may comprise three optical components, i.e., a lenticular lens, a circular Fresnel lens and a linear Fresnel lens.

An angle of the lens system defined by a ray toward an upper end of the screen and the optical axis of the lens system is substantially equal to an angle of the lens system defined by a ray toward a lower end of the screen and the optical axis of the lens system.

The projection television set may take another arrangement such that the projection source is arranged above the reflector mirror, a ray of light emitted along an optical axis of the lens system of the projection source is reflected by the reflector mirror, and a positional relationship among the screen, the projection source and the reflector mirror is determined so that the reflected ray of light is incidental from a lower side to an upper side relative to the screen.

The projection source is arranged substantially in parallel to the screen.

A coolant liquid is filled in the projection source.

The lenticular lens, the circular Fresnel lens and the linear Fresnel lens are arranged so that the linear Fresnel lens controls the rays of vertical direction to be emitted from the screen substantially in a direction normal to the screen.

A center of the circular Fresnel lens is offset upwardly of the center of the screen.

A ratio Sp/Lp of a tooth pitch Lp of the linear Fresnel lens to a tooth pitch Sp of the circular Fresnel=lens is in the range of 0.2 to 2.0.

According to another aspect of the present invention, the screen consists essentially of a lenticular lens, a circular Fresnel lens and a linear Fresnel lens and a lens surface of the linear Fresnel lens is aspheric.

The rays of light from an upper portion of the screen are converged to a position behind a position where the rays of light from a lower portion of the screen are converged.

A tooth angle of each tooth of a lower end portion of the linear Fresnel lens is greater than a tooth angle of each tooth of an upper end portion of the linear Fresnel lens.

An optical center of the circular Fresnel lens is located above a center of the screen.

According to still another aspect of the invention, there is provided a projection system for a projection television set for projecting an image formed on a projection tube through a projection lens onto a screen, the system comprising the improvement wherein an optical axis of the projection lens having an incident angle in a perpendicular direction relative to the screen is offset from a center of the screen so that the incident angle is small.

The optical axis of the projection lens is offset from the center of the screen so that four three-dimensional angles defined between a centerline of the projection lens and each direction toward corners of the screen are substantially equal to each other, within an angle difference of 10% or less, at any position in the range of 60 to 100% of a diagonal distance from the center of the screen to each corner.

A center of a fluorescent surface of the projection tube is substantially coincident with a center of an image field on a scanning plane.

The system may further comprise a reflector mirror for reflecting the rays of light from the projection lens toward the screen.

BRIEF DESCRIPTION OF THE DRAWINGS

In the accompanying drawings:

FIG. 20 is a side elevational view showing a conventional screen made in one-piece;

FIG. 21 is an illustration showing a conventional ray controlling system for a projection TV set;

FIG. 22 is a front view of a conventional screen assembly;

DESCRIPTION OF THE PREFERRED EMBODIMENTS

The present invention will now be described with reference to the accompanying drawings.

Figure 3:
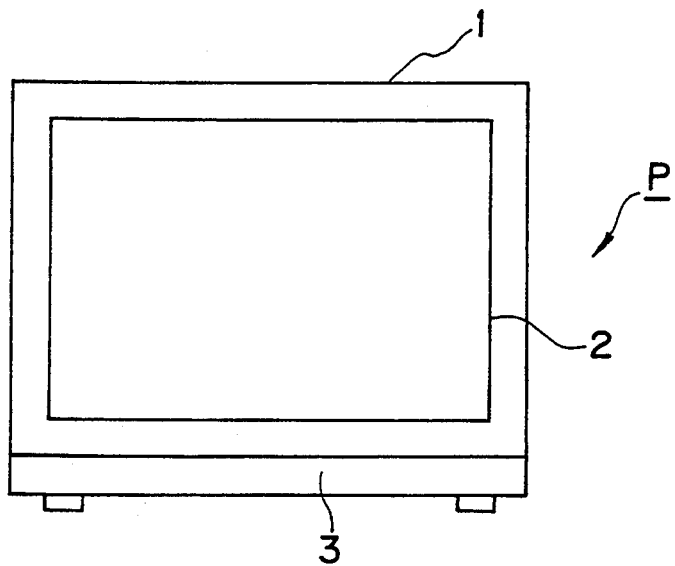
FIG. 3 is a frontal view showing a projection TV set according to the present invention.
Figure 4:
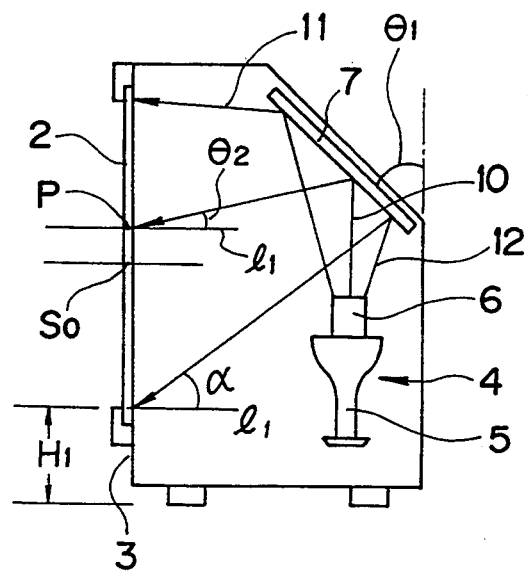
FIG. 4 is a side elevational view showing an internal structure of the projection TV set shown in FIG. 3.

As shown in FIGS. 3 and 4, a projection television set P according to the invention has a casing 1. A rectangular screen 2 is provided on a front face of the casing 1. A skirted portion 3 (i.e., lower space) having a decreased height is formed below the rectangular screen 2.

A projection source 4 is provided substantially in a vertical direction, i.e., in parallel to the screen 2 in a position close to a rear side of the casing 1. The projection source 4 is composed of a CRT unit 5 as a controller for a color and a projection lens assembly 6. The lens assembly 6 is positioned at a position upper than the lower end of the screen 2. A reflector mirror 7 is obliquely provided vertically upwardly of the projection source 4. For example, an angle $\theta_1$ defined between the vertical line and the reflector mirror 7 is set at 52°. A ray of light 10 along the optical axis of lenses of the lens assembly 6 of the projection source 4 is incidental to the screen 2 at an incident angle $\theta_2$ after the reflection at the reflector mirror 7. For example, the incident angle $\theta_2$ is set at 15°. The incident angle $\theta_2$ is defined between a normal line $l_1$ and the ray of light 10 along the optical axis. An incident point P of the ray of light 10 along the optical axis to the screen 2 is located above a center So at the screen center height. A height of an upper edge of the screen 2 is set substantially at a height of an upper edge of the above-described reflector mirror 7.

Figure 5:
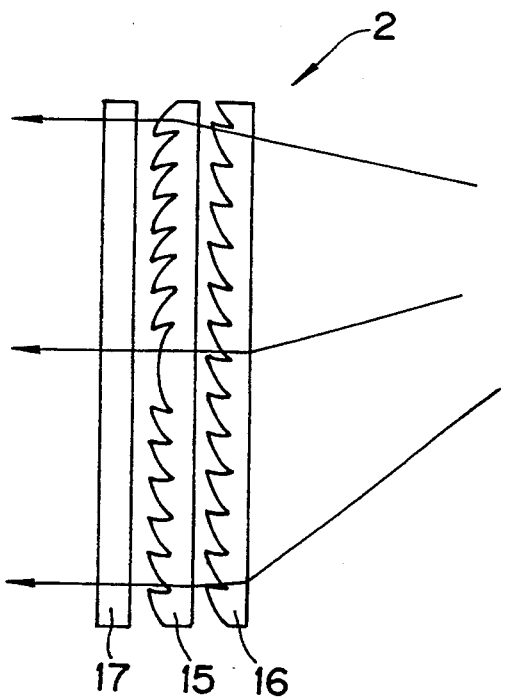
FIG. 5 is a cross-sectional view showing a screen assembly according to the invention.

If the screen 2, the reflector mirror 7 and the projection source 4 are arranged in the above-described positional relation, then an angle α defined between a ray of light 12 which is emitted from the projection source 4, reflected at the reflector mirror 7 and reaches a lowermost edge of the screen 2 and the normal line $l_1$ of the screen 2 is increased whereby a space where the projection source 4 is received is formed in a large size below the ray of light 12. For this reason, it is possible to locate the projection source 4 more upwardly than the conventional arrangement. Accordingly, the total height of the casing 1 may be reduced. Also, since the installed position of the projection source 4 is located at a height more upwardly than the conventional arrangement with respect to the screen 2, a height H1 of the skirted portion 3 is very small. Although the ray of light 11 from the projection source 4 is incidental to the upper edge portion of the screen 2 from the upper side to the lower side, since almost all the rays of light through the screen 2 except for the ray of light 11 are advanced more downwardly of the position of the eyes of the observer. As a result, it is likely that the brightness of the image field of the screen 2 is dark. Therefore, according to the present invention, the screen 2 is composed of a lenticular lens 17, a circular lens 15 and a linear Fresnel lens 16 having a lens surface where a number of horizontal line grooves are formed, whereby the rays of light incidental obliquely to the screen 2 are refracted substantially in the horizontal direction as shown in FIG. 5. If the rays of light emitted from the screen 2 are thus emitted substantially in the horizontal direction, it is possible to effectively avoid the decreased brightness of the field of image.

It is preferable that an optical path length of each ray of light emitted from the projection source 4 to be incidental to the screen 2 after the deflection at the reflector mirror 7 be set in the range of 750–800 mm with respect to an image field size of 40 inches. In the case of an image field side of 50 inches, it is preferable that the optical path length be in the range of 850–1,000 mm. Namely, if the optical path length would be too large, the skirted portion would be enlarged in size, whereas if the optical path length would be too short, an angle of view would be increased so that it would be difficult to compensate for distortion at the marginal portion of the image field.

Figure 7:
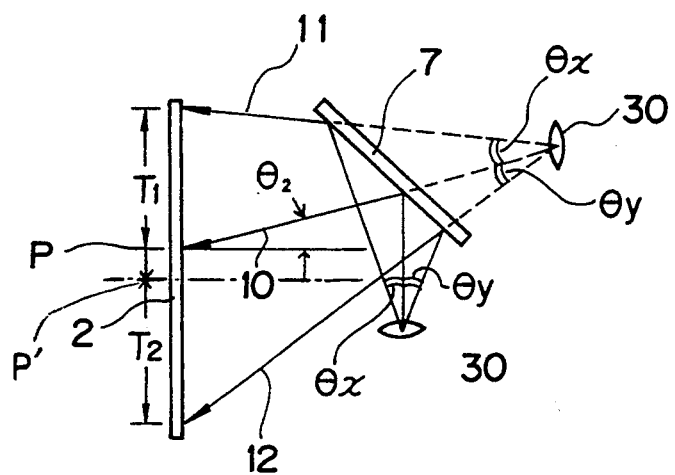
FIG. 7 is an illustration of a light ray incidental state to the screen assembly according to the invention.

In order to make uniform the brightness of the image field of the screen 2 as a whole, as shown in FIG. 7, an angle $\theta_x$ defined between the ray of light 10 emitted from the lens 30 of the lens assembly along the optical axis and the ray of light 11 emitted from the lens 30 toward the uppermost edge of the screen 2 is set substantially at the same angle as an angle $\theta_y$ defined by the ray of light 10 along the optical axis and the ray of light 12 incidental to the lowermost edge of the screen 2. Thus, the reason why the angle $\theta_x$ and the angle $\theta_y$ are substantially equal to each other is that, if the optical axis of the lens 30 is pointed to a center p' of the screen 2, then the angle $\theta_x$ is greater than the angle $\theta_y$ so that it is likely that the light quantity of the upper portion of the screen 2 would be insufficient. Accordingly, the optical axis of the lens 30 is pointed to the point P on the screen 2 and the relationship where the angle $\theta_x$ is substantially equal to the angle $\theta_y$. Regarding the angles $\theta_x$ and $\theta_y$, detailed explanations will be made herein after.

Figure 2:
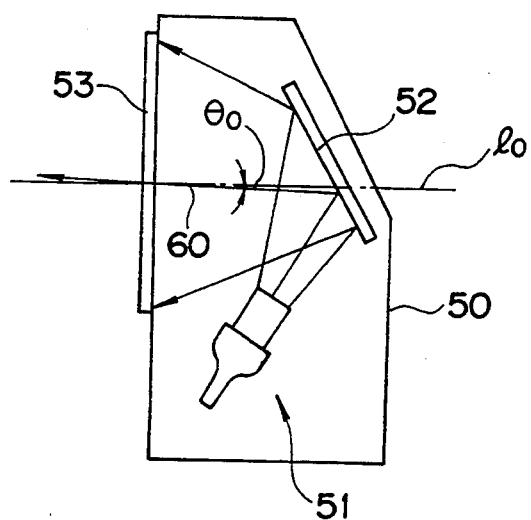
FIG. 2 is an illustration of an internal structure of another conventional projection TV set.
Figure 8:
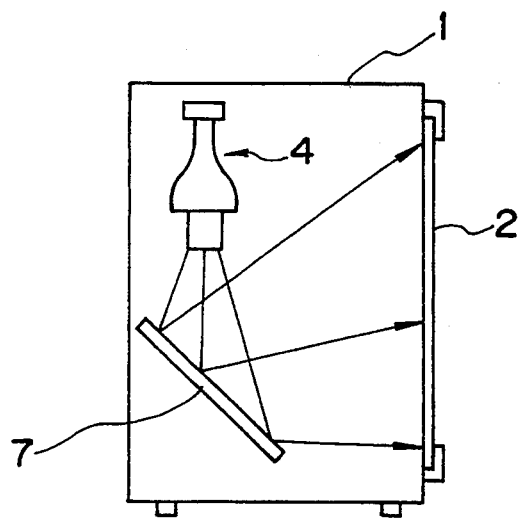
FIG. 8 is an illustration of an arrangement according to another embodiment of the invention.

In the foregoing embodiment, the projection source 4 is provided in the lower portion of the casing 1. However, it is possible to locate the projection source 4 at an upper portion of the casing 1, as shown in FIG. 8, and to locate the reflector mirror 7 at a lower portion of the casing 1, as shown in FIG. 2. Since the skirted portion is small in size, it is possible to adapt the reverse arrangement to the arrangement of the foregoing embodiment.

Figure 6:
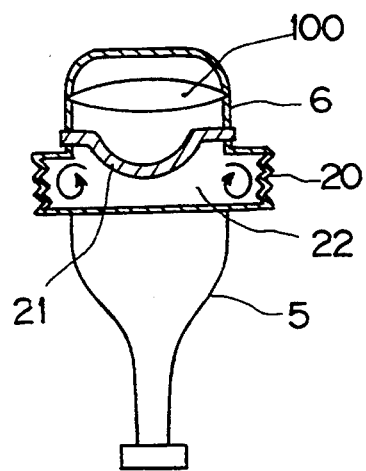
FIG. 6 is an illustration of a projection source according to the invention.

Referring now to FIG. 6, a structure of the projection source 4 will be described. A radiator 20 is used to couple the CRT unit 5 and the lens assembly 6 with each other. The radiator 20 has a concave lens 21. A coolant liquid 22 is sealed in the radiator 20 to cool the CRT unit 5. The lens assembly 6 has a first lens 100 therein.

According to the present invention, since the projection source 4 is provided substantially in the vertical direction, i.e., in parallel to the screen 2 (for example, in the slant angle range of 0°–5°), the coolant 22 will be subjected to convection so that the cooling effect is made uniform at any place of the CRT unit 5. Accordingly, there is no difference in refractive index and no deformation of the lens in any place. It is therefore possible to insure the very high image quality. On the other hand, in the conventional arrangement, the projection source 51 is slanted, and hence the it is impossible to insure a uniform convection of the coolant within the coupler 20 so that heat will be concentrated on an upper portion of the slanted coupler 20. As a result, there is a temperature difference between the high position and low position of the lens unit 6. Consequently, there is a difference in refractive index of the lens to degrade the lens performance and to deteriorate the focusing performance. According to the present invention, it is possible to overcome these concomitant defects caused by the arrangement where the projection source 4 is obliquely provided.

Incidentally, although the description has been made as to the CRT unit, it is possible to equally apply the present invention to an LCD unit with a projection lens, a light source and a LCD controller if the optical axis of the projection lens is substantially in parallel to the screen and the optical axis of the rays of light from the reflector mirror is projected to the screen from above.

As described above, with such an arrangement of the invention, it is unnecessary to provide a large space for the skirted portion at the lower portion of the screen. It is possible to decrease the size of the casing as a whole without decreasing the dimension of the screen, and to decrease the height of the front face of the casing. Even if associated equipments such as VTRs and laser disc players would be installed in a rack within the casing, there is no fear that the eye point of the observer would be largely offset from the center position of the screen. Thus, there is flexibility in installing the associated equipments such as VTRs and laser disc players as desired.

Figure 9:
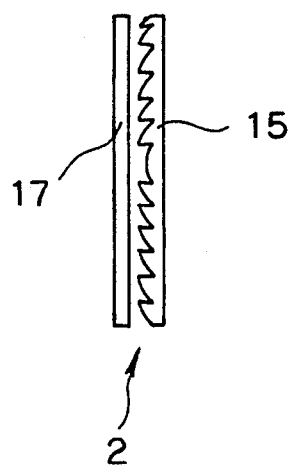
FIG. 9 is an illustration of a screen assembly according to the prior art.

On the other hand, as shown in FIG. 9, if the screen 2 is composed of two overlap components, i.e., a lenticular sheet 17 and a circular lens 15, the ray of light 10 (FIG. 7) along the optical axis as well as other rays of light is emitted downwardly from the screen 2 so that the light does not effectively reaches the observer and so that a dark image is observed by the observer. Also, there is non-uniformity in color in the image.

Figure 10:
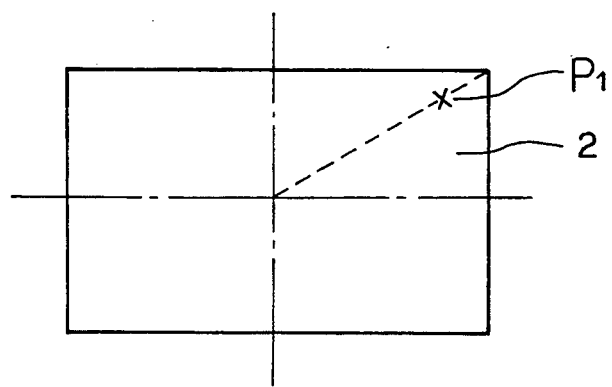
FIG. 10 is a front view of the screen.

More specifically, in the position $P_1$ which is defined by 90% of a diagonal line of the image field as shown in FIG. 10, in the case where with the conventional arrangement of the projection source 4, as shown in FIG. 21 a ray of light 63 (FIG. 11) is incidental at an incident angle $\gamma_0$ to a flat surface $15b$ of the circular lens 15, the ray of light 63 is introduced at an incident angle $\theta_0$ to a lens surface $15a$ of the circular Fresnel lens 15 and is emitted toward the observer through the lenticular lens 17 substantially in the horizontal direction. However, in the slant projection system as shown in FIG. 7, a ray of light 64 is introduced to the flat surface $15b$ of the circular Fresnel lens 15 at an incident angle $\gamma_1$ which is smaller than the incident angle $\gamma_0$ and is projected to the lens surface 15a at an incident angle $\theta_1$ which is greater than the incident angle $\theta_0$ to be emitted downwardly. As a result, the image field will be dark.

Figure 13:
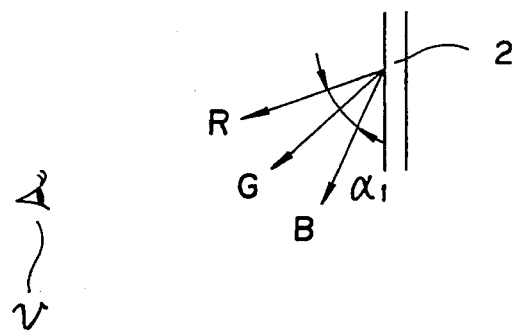
FIG. 13 is an illustration of an emergent ray state in the conventional screen.
Figure 14:
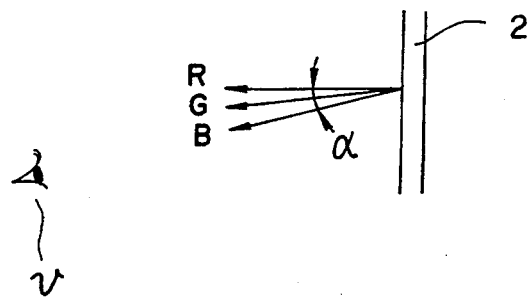
FIG. 14 is an illustration of an emergent ray state in a horizontal projection system.

Also, in the slant projection system shown again in FIG. 7, a differential angle $\alpha_1$ between a red ray R and a blue ray B in the emergent direction from the screen 2 is about 5° to 6° due to the difference of refractive index between the red ray R and the blue ray B as shown in FIG. 13, so that the light ray B is far away from the observer's eyes v. Accordingly, in this case, the observer feels non-uniformity in color, i.e., the image from which the blue tone has been removed. In contrast, in the conventional horizontal projection system shown in FIG. 1, the differential angle $\alpha$ is kept small at about 1.0 to 1.5° as shown in FIG. 14. Therefore, if the conventional lens composed of two elements would be used for the slant projection system, not only would the image field be dark but non-uniformity in color would be likely to occur.

Figure 16:
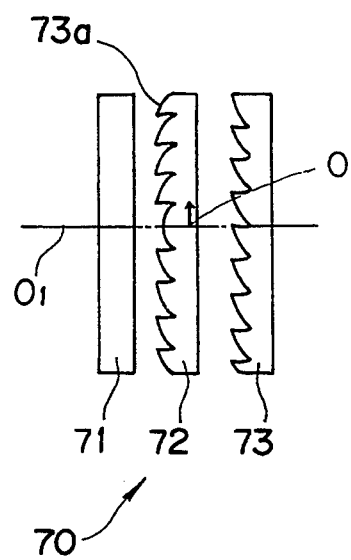
FIG. 16 is an illustration of the screen according to the invention.
Figure 17:
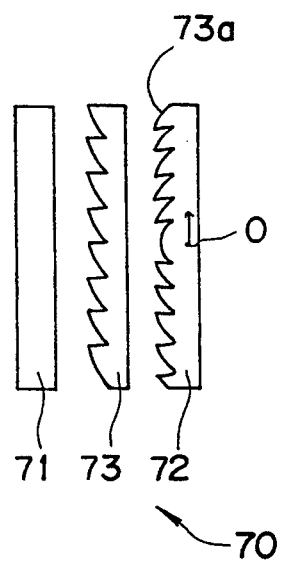
FIG. 17 is an illustration of the screen according to another embodiment of the invention.
Figure 18:
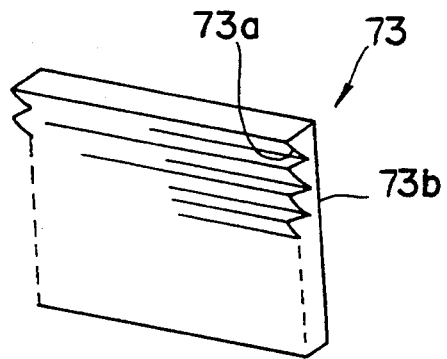
FIG. 18 is a perspective view showing a linear Fresnel lens according to the invention.

According to the present invention, as shown in FIGS. 15 to 18, a screen 70 has a lenticular sheet 71, a circular Fresnel lens 72 overlapped on the lenticular sheet 71, and a linear Fresnel lens 73 overlapped on the circular Fresnel lens 72. As shown in FIG. 18, the linear Fresnel lens 73 has a lens surface 73a in the form of a number of horizontal linear grooves and a planar surface 73b on the opposite side to the lens surface 73a. The linear Fresnel lens 73 is used to control the light rays introduced from the projection source by changing the refractive angles, whereby the incident light rays are directed in parallel in cooperation with the circular Fresnel lens 72.

Figure 11:
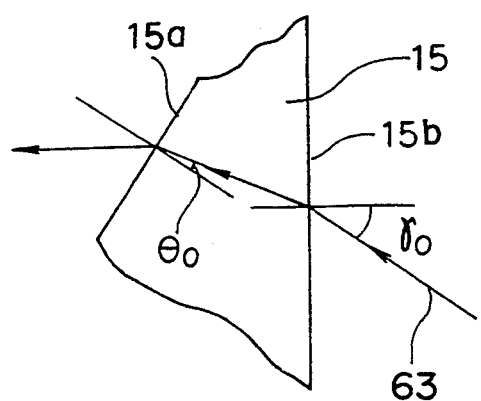
FIG. 11 is an illustration of the operation of the screen assembly.
Figure 12:
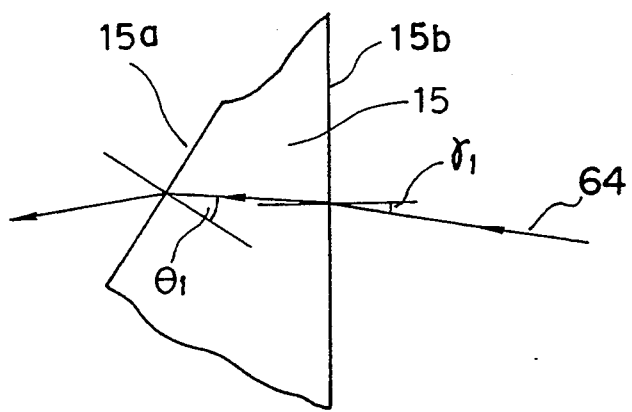
FIG. 12 is an illustration of the conventional structure.
Figure 15:
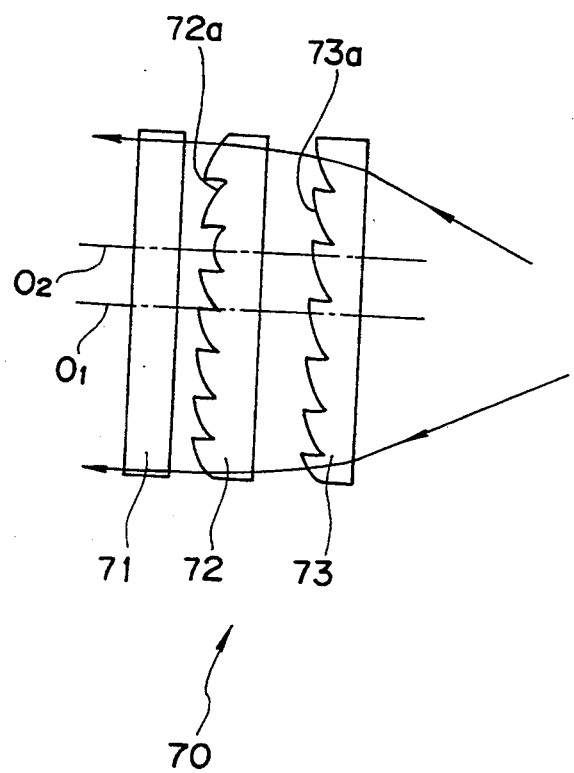
FIG. 15 is a cross-sectional view showing a screen according to the invention.
Figure 19:
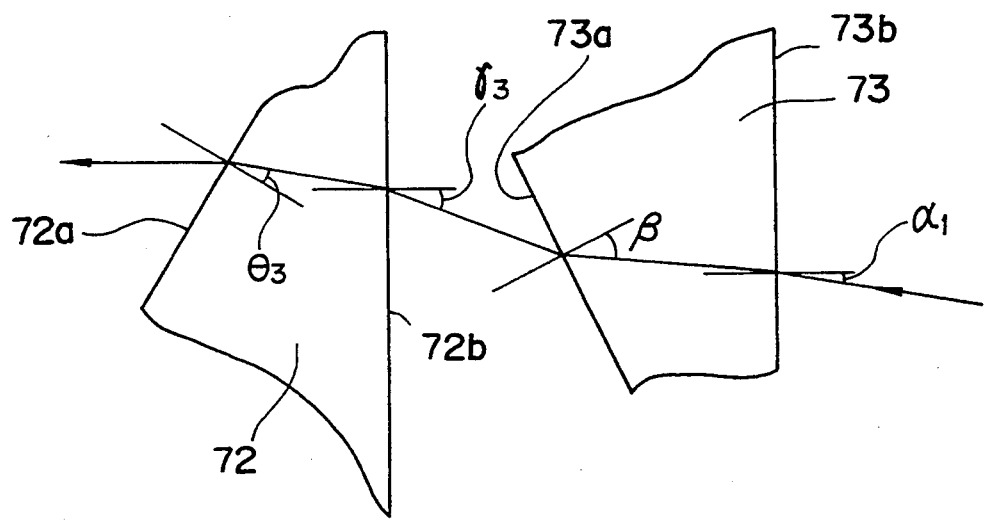
FIG. 19 is an illustration showing an optical path in the screen according to the invention.

More specifically, in the slant projection system as shown in FIG. 19, the ray of light with an incident angle $\alpha_1$ to the planar surface 73b of the linear Fresnel lens 73, which incident angle is smaller than that of the conventional arrangement, is introduced to the lens surface 73a at an incident angle $\beta$ and further the ray of light emergent from the lens surface 73a is introduced at an incident angle $\gamma_3$ to the planar surface 72b of the circular Fresnel lens 72. The light ray is further introduced at an incident angle $\theta_3$ into the lens surface 72a and emitted substantially in the horizontal direction. The incident angle $\theta_3$ is substantially equal to the incident angle $\theta_0$ shown in FIG. 11. Namely, in the conventional parallel projection system, as shown in FIG. 11, the light ray which is to be introduced into the planar surface 15b of the circular Fresnel lens 15 has the larger incident angle $\gamma_0$, whereas in the slant projection system according to the present invention, the incident angle $\alpha_1$ (FIG. 19) of the light ray introduced into the planar surface 72b of the linear Fresnel lens 72 is substantially equal to the incident angle $\gamma_1$ shown in FIG. 12. Although, thus, the incident angle $\gamma_0$ is different from the incident angle $\alpha_1$ ($\gamma_1$), the ray of light emitted from the lens surface 72a of the circular Fresnel lens 72 is substantially in parallel to the horizontal direction. Accordingly, even if the light ray is introduced obliquely from above into the screen, the ray of light is directed in the horizontal direction when the light ray is emitted from the screen. Thus, if the ray of light passes through the screen in the horizontal direction, then it transmits and diffuses through the lenticular sheet or lens 71 to make uniform the brightness of the image field and to prevent effectively the non-uniformity in color. Incidentally, in the slant projection system as shown in FIG. 7, the ray of light passing through the lower portion of the screen has to be refracted at an angle larger than the ray of light passing through the upper portion of the screen. For this reason, it is possible to locate the center of the circular Fresnel lens 72 at a position $O_2$ upwardly offset from the center $O_1$ of the screen 70 as shown in FIG. 15.

Also, as shown in FIG. 17, it is possible to reverse the arrangement order of the circular Fresnel lens 72 and the linear Fresnel lens 73 to the order shown in FIG. 16 with the tooth form of the circular Fresnel lens 72 corresponding to the tooth form of the linear Fresnel lens 73.

In the foregoing embodiment, in view of the affect of Moire phenomenon, it is preferable to cause a ratio of a pitch Lp of the tooth form of the linear Fresnel lens 73 to a pitch Sp of the tooth form of the circular Fresnel lens 72 of the screen assembly to fall within a range of 0.2–2.0. In the embodiment, the pitches of the respective lenses 72 and 73 are set at the same value.

As described above, in the rear projection TV set with the projection system, it is possible to emit, in the horizontal direction, the light rays which have been introduced obliquely to the screen and it is possible to cancel the color non-uniformity and to keep the image field bright.

Figure 1:
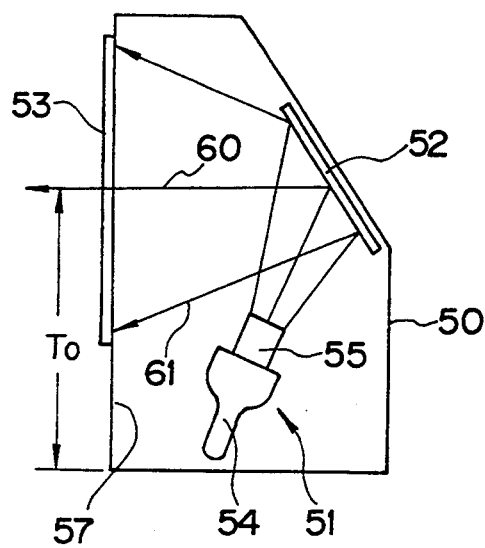
FIG. 1 is an illustration of an internal structure of a conventional projection TV set.

On the other hand, in the conventional arrangement shown in FIG. 1, the screen 53 may be formed of a single combined screen assembly composed of a circular Fresnel lens 53a and a lenticular lens 53b attached to the front side of the circular Fresnel lens 53a as shown in FIG. 20. Also, as mentioned before, it is possible to form the screen assembly of two components instead of the combined single component screen. In this case, the screen 2 is composed of a lenticular lens sheet 17 and a circular Fresnel lens 15 as shown in FIG. 9.

In such a rear projection TV set, as shown in FIG. 21, a ray of light emitted from the lens 6 of the projection source 5 is advanced through the screen 2 substantially in the horizontal direction. The TV set suffers from such a problem that the pictorial image would be dark at four corner parts C, C, . . . C of the screen 2 as best shown in FIG. 22. In order to achieve the uniform brightness of the screen 2, the following measures have been proposed but involves defects. Namely, there has been a method in which a refractive power of the circular Fresnel lens is increased to converge the rays of light, but this method suffers from such a defect that a difference in permeability of the lens between red and blue rays is increased and non-uniformity in color would occur. Also, there has been a method that a stop diaphragm is interposed in the projection lens system but this method also suffers from such a problem that the overall brightness of the image field would be dark although it would be possible to obtain the uniform brightness over the image field. Furthermore, there has been a method in which an electrical adjustment means is used to increase the brightness at the marginal portions but this method would make an electric circuit therefor complicated, resulting in an increased cost.

Figure 23:
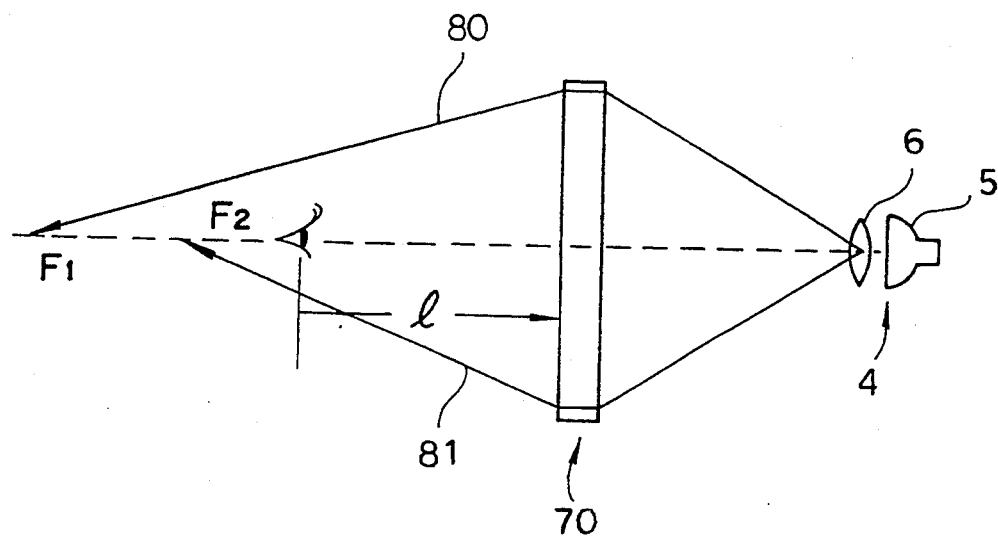
FIG. 23 is an illustration of a ray controlling system according to the present invention.
Figure 24:
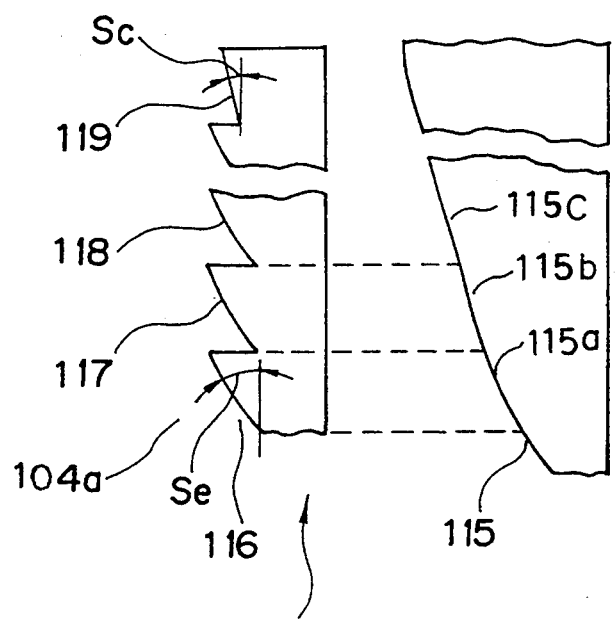
FIG. 24 is a cross-sectional view showing a linear Fresnel lens according to the present invention.

Therefore, according to another aspect of the present invention, the screen assembly is composed of three components as shown in FIG. 16 or 17, and the screen 70 is used so that a light ray emitted from a lens 6 arranged in front of a light source 5 of a projection source system 4 is directed to a centerline $O_1$ of the screen 70 after the light ray has been emitted from the screen 70. As shown in FIG. 23, the ray of light emitted from the lens 6 is directed to the centerline of the screen 70. More specifically, the ray of light 80 introduced into the upper portion of the screen 70 is focused at a point $F_1$ on the centerline of the screen 70, whereas the ray of light 81 which has passed through the lower portion of the screen 70 is focused at a point $F_2$ on the centerline of the screen 70. It is preferable that, in case of a TV set of 40 inch size, the position of the eyes of the observer be at a position by a distance L=3 m from the front face of the screen 70. If the rays of light 80 and 81 are thus converged toward the centerline of the screen 70, the brightness at the corner portions of the image field is kept at a high level to the observer's eyes v with overall uniform brightness. Also, the above-described requirement should be met in order to provide a suitable image for more observers who watch the TV set. There is no more unusual visual feeling for the observers who stay far away from the TV set in the case where the upper portion of the screen is brighter than the lower portion thereof. In order to control the rays of light which have passed through the upper and lower portions of the screen, as shown in FIG. 24, the above-described linear Fresnel lens 73 has a shape defined by surfaces 116 and 117. More specifically, a lens surface 104a of the linear Fresnel lens 73 is spherical. The surface 104a has second lens surfaces 116, 117, 118, ... 119 which form an spherical surface as a whole. Namely, these unit lens surfaces 116, 117, ... 119 may be regarded as a continuous spherical surface 115. Thus, a part 115a of the spherical surface 115 corresponds to the unit lens surface 116, a part 115b of the spherical surface 115 corresponds to the unit lens surface 117, and a part 115b of the spherical surface 115 corresponds to the unit lens surface 118. A linear tooth angle Se of the lowermost unit lens surface 116 of the linear Fresnel lens 73 is set at a larger angle than that of the upper tooth angle Sc. Thus, if the tooth angle Se of the lower part of the linear Fresnel lens 73 is greater than the tooth angle Sc of the upper part of the linear Fresnel lens 73, as shown in FIG. 24, the ray of light 81 which has passed through the lower end portion of the screen 70 is converged toward the front focal point $F_2$, whereas the ray of light 80 which has passed through the upper end portion of the screen 70 is converged toward the rear focal point $F_1$. Incidentally, the tooth angle of the unit lens surfaces such as the intermediate lens surfaces 117, 118 ... is gradually decreased. The tooth angle of the unit lens surface of the spherical surface is determined by the following equation:

$$S = A1 \times H + A2 \times H^2 + A3 \times H^3 + A4 \times H^4 + A5 \times C5 + C$$

where A1 to A5 and C are constants and are represented by the following chart:

TABLE 1

| Linear Tooth Angle Coefficients | |
| --- | --- |
| C | 4 to 27 |
| A1 | $-0.01$ to $-0.035$ |
| A2 | $-4 \times 10^{-5}$ to $-7 \times 10^{-5}$ |
| A3 | $7 \times 10^{-8}$ to $4 \times 10^{-8}$ |
| A4 | $2 \times 10^{-10}$ to $1 \times 10^{-10}$ |
| A5 | $-1 \times 10^{-13}$ to $-8 \times 10^{-13}$ |

Figure 25:
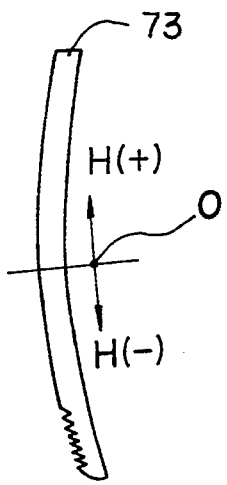
FIG. 25 is a side-elevational view showing the linear Fresnel lens according to the invention.

Assuming that the original point of the centerline of the linear Fresnel lens 73 is represented by O (see FIGS. 16 and 17), H in the above equation is the distance from the original point O as shown in FIG. 25. If the tooth angle coefficient would be exceeded over the lower limit, the focal point would be too far and it would be impossible to obtain a predetermined light quantity at the desired position to cause the non-uniformity in color. Inversely, if the tooth angle coefficient would be exceeded over the upper limit, the focal point would be too close and the observers who stay far away from the TV set could only see the bright central portion of the screen. In order to control the rays of light 80 and 81 as shown in FIG. 23, it is possible to locate or offset the center O upwardly of the circular lens 72 as indicated by an arrow in FIG. 16 or 17. Thus, if the center O of the circular Fresnel lens 72 is offset upwardly, the refractive power of the lower lens surfaces is increased whereas the refractive power of the upper lens surfaces is decreased. As a result, the lower rays of light 81 are converged at a point closer to the screen than the upper rays of light 80.

Also, the control system for the rays of light may be applied to a type where the optical axis of the lens system of the projection source 4 is obliquely projected to the screen 2 as shown in FIGS. 4 and 7. Namely, it is possible to apply the optical system having the spherical linear Fresnel lens to the case where, as shown in FIG. 4, the rays of light emitted from the projection source 4 is reflected by the mirror 7 located above the projection source 4 and the ray of light along the optical axis introduced from above toward the central portion of the screen 2 at a predetermined incident angle.

Figure 31:
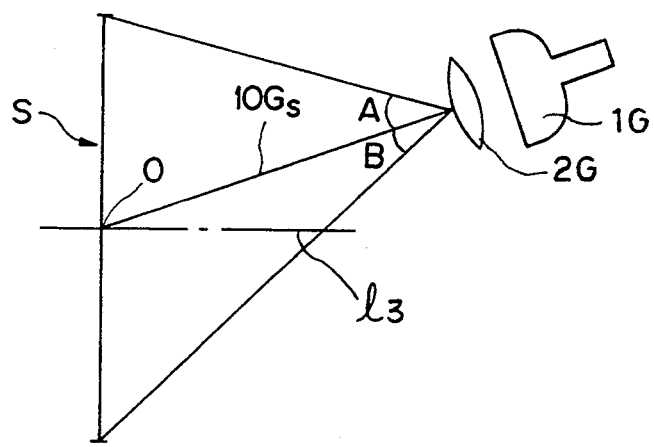
FIG. 31 is an illustration of a projection system of a conventional projection TV set.
Figure 32:
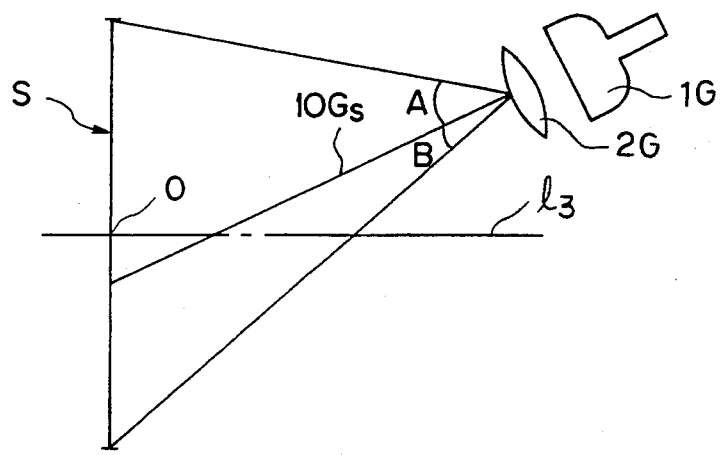
FIG. 32 is another illustration of a projection system of a conventional projection TV set.

On the other hand, in the arrangement, as shown in FIG. 31 and 32 in which the projection lens 2G is not located on the normal line $l_3$ to the center O of the screen S, the brightness of the lens 2G is decreased in proportion to the value of cosine(X)4 where X is a half-view angle. The half-view angle is an angle between the optical axis 10GS and rays directed to the upper and lower ends of the screens. In general, the half-view angle A is larger than the half-view angle B, and therefore it is likely that the brightness of the upper side of the screen S is smaller than that of the lower side of the screen S. Also, it is known that the focusing performance (ability) of a lens is degraded in accordance with an increased view angle. Thus, in the projection system, the focusing performance of the upper side of the lens is likely to be degraded. However, it is necessary to insure a predetermined lens performance at the half-view angle A which is larger than the angle B. In order to cope with these problems, the image distortion has been electrically compensated for by the convergence. In this case, the electrical power consumption for coping with the compensation would be increased and also unduly increased heats would be generated. Thus, a centering magnet for external magnetic fields has been used to compensate for the image field distortion by applying an external magnetic field to an electrode of the projection tube. However, if the movement amount is large, a so-called halo phenomenon in which the image is subjected to fogging in the direction of the image movement would occur.

Figure 26:
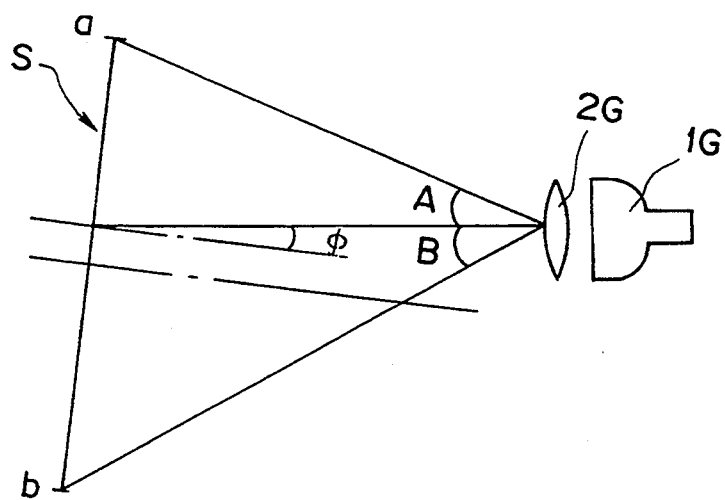
FIG. 26 is an illustration of an outline of a projection system for a projection TV set according to the invention.

Accordingly still another embodiment will now be described with reference to FIGS. 26 to 30. FIG. 26 shows a projection system for a green (G) projection tube 1G of a so-called RGB three tube projection type projection television set having red, green and blue projection tubes. On both sides of the green projection tube 1G, the red and blue projection tubes R and B are juxtaposed.

As shown in FIG. 26, in the projection system of the projection TV set, there are provided the projection tube 1G and a projection lens 2G. In FIG. 26, the projection lens 2G is located above a normal line $l_3$ to the center O of a screen S so that the rays of light are projected to the screen S from above. This embodiment also relates to the system where the optical system of the projection lens 2G is not coincident with the normal line l₃ of the center O of the screen S. The present invention may be applied equally to the case where the optical axis of the projection lens 2G is located below the normal line l₃ of the center O of the screen S. The projection tube 1G is preferably a CRT but it is possible to use an LCD therefor.

The projection system has an incident angle relative to the screen S. The optical axis of the projection lens 2G is offset in a direction where a half-view angle A is equal to a half-view angle B, that is, the incident angle $\phi$ is smaller. More specifically, four angles defined by the optical axis and four corners of the screen S in the diagonal direction are set at substantially the same in a three-dimensional manner so that the optical axis of the projection lens 2G is offset in the direction where the incident angle $\phi$ is smaller.

Thus, the brightness balance in the vertical direction of the screen S may be kept in a good condition. The brightness at an upper end a of the screen S is coincident with that at a lower end b of the screen S to provide a good performance balance as a whole. Also, since the balance of the view angle of the projection lens is kept in a good condition, a balance of the focusing performance of the projection lens between the upper end and lower end of the lens is improved. Further, since the view angle where the performance should be insured would become small, it is sufficient to improve the performance of the projection lens in lens design.

Figure 27:
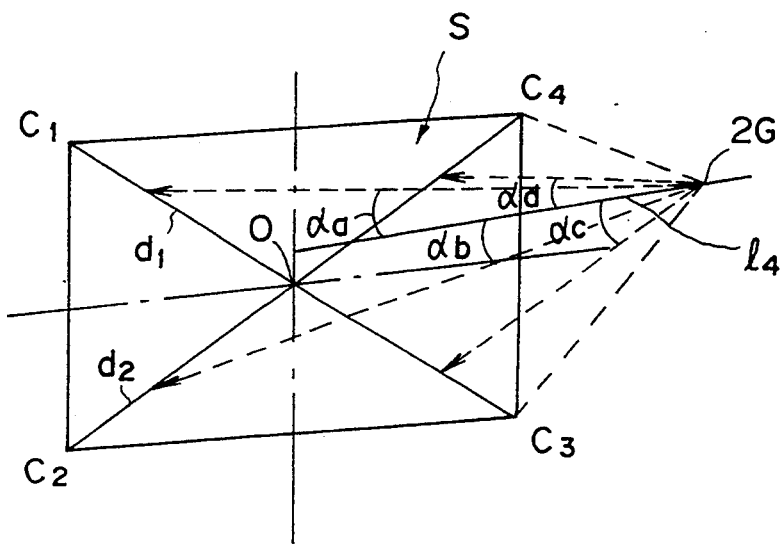
FIG. 27 is an illustration of a relationship between a screen and spatial points in the projection system according to the invention.
Figure 28:
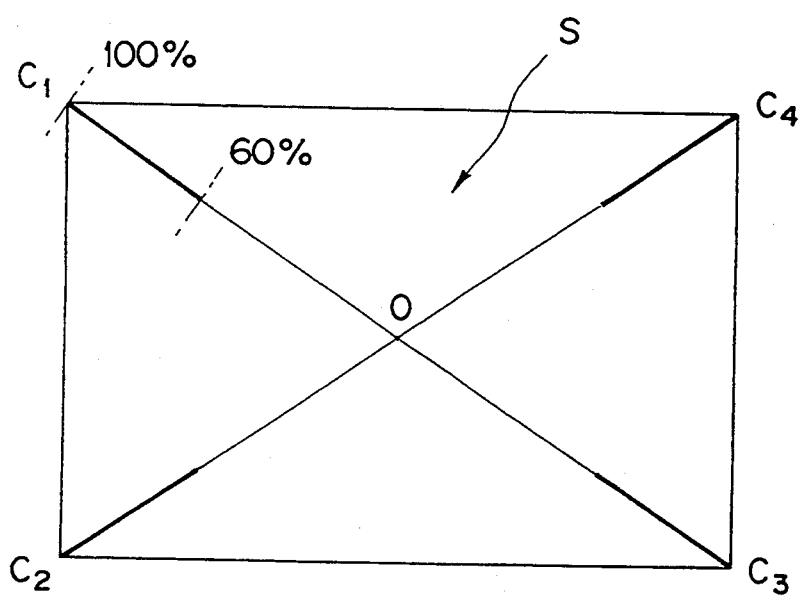
FIG. 28 is an illustration of a positional range of three-dimensional angles in a diagonal direction of the screen.

In this projection system, as shown in FIGS. 27 and 28, the optical axis l₄ of the projection lens 2G is offset from the center O of the screen S so that four angles $\alpha_a$, $\alpha_b$, $\alpha_c$ and $\alpha_d$ (referred to as diagonal angle) defined between the centerline $\alpha_4$ (i.e., optical axis) of the projection lens 2G and each direction toward two diagonal lines d₁ and d₂ between the corners C₁ and C₃·C₂ and C₄ of the screen S are kept substantially equal to each other at any position in the range of 60 to 100% of a diagonal distance from the center O of the screen S to each corner C₁, C₂, C₃ and C₄. In this case, "substantially equal" means that the differences between the four angles $\alpha_a$, $\alpha_b$, $\alpha_c$ and $\alpha_d$ are within 10%. It is therefore possible to further improve the performance balance such as brightness balance of the image field as a whole.

Any position point in "range of 60 to 100% of a diagonal distance from the center O of the screen S to each corner C₁, C₂, C₃ and C₄" means any desired point included in the range depicted by the solid line on each diagonal line in FIG. 28. If this point would be offset to the center O from the position of 60% of the distance in the diagonal direction, it would be sometimes impossible to improve the performance balance such as brightness balance of the overall image field. Inversely, if the point would be offset to the outside from the position of 100% (each corner), then the compensation would be excessive to reverse the brightness distribution and it would be sometimes impossible to keep the brightness balance under a good condition.

Figure 29:
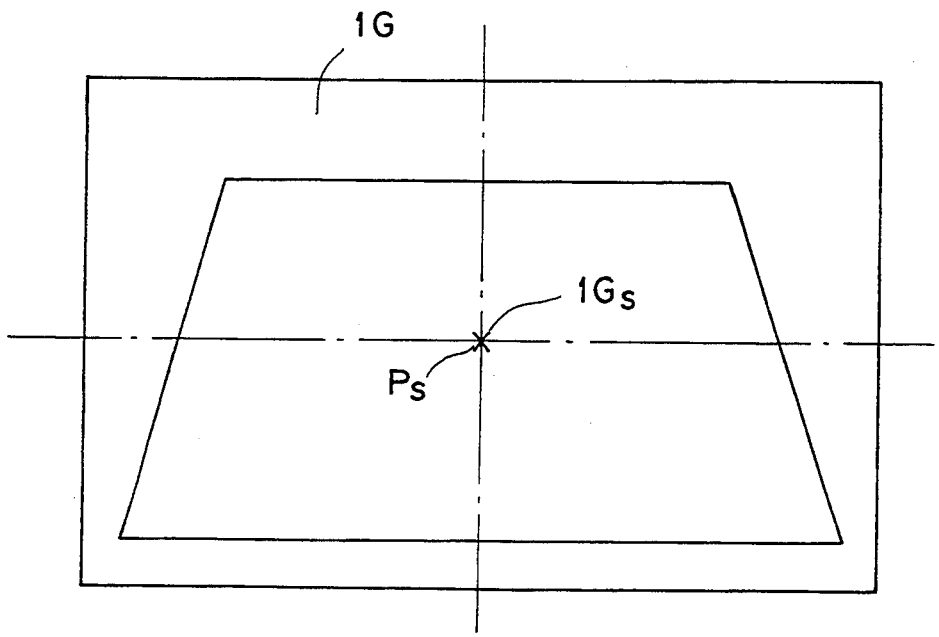
FIG. 29 is an illustration of the relationship between the center of the fluorescent surface of the projection tube and the center of the image.
Figure 30:
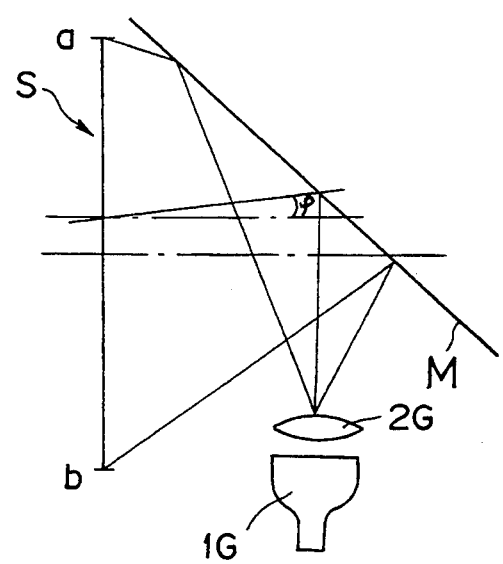
FIG. 30 is an illustration of the system according to another embodiment.

On the other hand, with respect to the positional relationship between the projection tube 1G and the projection lens 2G, as shown in FIG. 29, the center 1Gs of the fluorescent surface of the projection tube 1G is positioned substantially at the same position as the image field center Ps on the scanning surface. Thus, it is possible to decrease the compensation amount of the electrical field distortion and to decrease the movement amount of the image caused by a centering magnet of an external magnetic field to thereby prevent the halo phenomenon.

With this embodiment, the combination of the projection tube 1G and the projection lens 2G for green color (G) has been explained. The same system may be applied to the other combinations such as the projection tube 1R and the projection lens 2R for red color (R) and the projection tube 1B and the projection lens 2B for blue color (B). Each tube has a light source and a control unit for a color. The same arrangement of the respective projection tubes and the projection lenses may insure the same effect. More specifically, in case of RGB 3 beam type projection TV sets, it is preferable to arrange the projection tubes and projection lenses in the above-described arrangement for each combination thereof. However, the three-dimensional angles relative to the overall screen for the red (R) projection system and the blue (B) projection system are offset from the center of the screen.

Therefore, the diagonal angles relative to the overall screen should be selected suitably also in view of the offset amount in the horizontal direction relative to the screen (see Japanese Patent Application Laid-Open No. HEI2-116285).

The thus arranged projection system may be equally applied to an LCD projection television set having a single lens or a projection television set where any desired number of projection tubes are arranged suitably, as well as the so-called three beam RGB type projection TV set. The projection system may be applied also to a so-called front projection television set where rays of light which have passed through the projection lens are applied directly to the screen to obtain a focused image, and to a so-called rear projection television where rays of light which have passed through the projection lens 1G are reflected by the mirror M and are projected to the screen S to obtain a focused image as shown in, for example, FIG. 30.

According to the present invention, it is possible to keep the brightness balance of the overall image field, the color balance and the like in good conditions. It is also possible to decrease the electrical compensation amount by the convergence and the compensation amount by an external magnetic field by using a centering magnet. It is therefore possible to decrease heats generated in the system and to prevent the generation of halo. The system may be applied to any type of the projection television sets.

What is claimed is:

1. A rear projection television set including a screen which comprises a lenticular lens and a Fresnel lens, a reflector mirror located behind the screen, and a projection source which comprises a lens system for projecting rays of light to a rear side of the screen through the reflector mirror, said rear projection television set comprising an improvement wherein said projection source is arranged below said reflector mirror, a ray of light emitted along an optical axis of the lens system of the projection source is reflected by the reflector mirror, a positional relationship among the screen, the projection source and the reflector mirror is determined so that the reflected ray of light is incidental from an upper side to a lower side relative to the screen, said lens system of the projection source is positioned at a position upper than lower end of the screen, said projection source further comprises a light source and a control unit for each color of R, G and B, and an optical axis of the reflected ray of light is offset upward from a center of the screen in such a manner that an angle defined between a ray of light projected toward an uppermost edge of the screen and said optical axis of the reflected ray of light is substantially equal to an angle defined between a ray of light toward the lowermost edge of the screen and said optical axis of the reflected ray of light.

2. The rear projection television set according to claim 1, wherein the optical axis of the lens system of said projection source is arranged substantially in parallel to the screen.

3. The rear projection television set according to claim 2, wherein said screen comprises a lenticular lens, a circular Fresnel lens and a linear Fresnel lens.

4. The rear projection television set according to claim 3, wherein an angle of the lens system defined by a ray toward an upper end of the screen and the optical axis of the lens system is substantially equal to an angle of the lens system defined by a ray toward a lower end of the screen and the optical axis of the lens system.

5. The rear projection television set according to claim 2, wherein a coolant liquid is filled in a radiator between a CRT and a first lens of said lens system.

6. The rear projection television set according to claim 3, wherein the lenticular lens, the circular Fresnel lens and the linear Fresnel lens are arranged so that said linear Fresnel lens controls the rays of vertical direction to be emitted from the screen substantially in a direction normal to the screen.

7. The rear projection television set according to claim 6, wherein a center of the circular Fresnel lens is offset upwardly of the center of the screen.

8. The rear projection television set according to claim 3, wherein a ratio Sp/Lp of a tooth pitch Lp of the linear Fresnel lens to a tooth pitch Sp of the circular Fresnel lens is in the range of 0.2 to 2.0.

9. A rear projection television set including a screen which comprises a lenticular lens and Fresnel lens, a reflector mirror located behind the screen, and a projection source which comprises a lens system for projecting rays of light to a rear side of the screen through the reflector mirror, said rear projection television set comprising an improvement wherein said projection source is arranged above said reflector mirror, a ray of light emitted along an optical axis of the lens system of the projection source is reflected by the reflector mirror, a positional relationship among the screen, the projection source and the reflector mirror is determined so that the reflected ray of light is incidental from a lower side to an upper side relative to the screen, said projection source further comprises a light source and a control unit for each color of R, G and B, and an optical axis of the reflected ray of light is offset downward from a center of the screen in such a manner that an angle defined between a ray of light projected toward an uppermost edge of the screen and said optical axis of the reflected ray of light is substantially equal to an angle defined between a ray of light toward the lowermost edge of the screen and said optical axis of the reflected ray of light.

10. The rear projection television set according to claim 9, wherein the optical axis of the lens system of said projection source is arranged substantially in parallel to the screen.

11. The rear projection television set according to claim 10, wherein a coolant liquid is filled in a radiator between a CRT and a first lens of said lens system.

12. A rear projection television set wherein rays of light from a projection source are projected from a rear side of a screen, said rear projection television set comprising the improvement wherein said screen consists essentially of a lenticular lens, a circular Fresnel lens and a linear Fresnel lens and a lens surface of said linear Fresnel lens is aspheric.

13. The rear projection television set according to claim 12, wherein the rays of light from an upper portion of the screen are converged to a position behind a position where the rays of light from a lower portion of the screen are converged.

14. The rear projection television set according to claim 13, wherein a tooth angle of each tooth of a lower end portion of the linear Fresnel lens is greater than a tooth angle of each tooth of an upper end portion of the linear Fresnel lens.

15. The rear projection television set according to claim 14, wherein an optical center of the circular Fresnel lens is located above a center of the screen.

16. A rear projection television system comprising:
a screen comprising a lenticular lens and a Fresnel lens;
a reflector mirror located behind the screen; and
a projection source comprising a lens assembly for projecting rays of light to a rear side of the screen through the reflector mirror, a light source and a control unit for each color of R, G and B, an optical axis of rays reflected from the mirror to the screen being offset upward from a center of the screen in such a manner that an angle defined between a ray of light projected toward an uppermost edge of the screen and said optical axis of the reflected rays is substantially equal to an angle defined between a ray of light toward the lowermost edge of the screen and said optical axis of the reflected rays.

17. A rear projection television system according to claim 16, wherein said Fresnel lens comprises a circular Fresnel lens and a linear Fresnel lens.

18. A rear projection television system according to claim 17, wherein said linear Fresnel lens has an aspheric lens surface.

19. A rear projection television system according to claim 16, wherein said light source comprises three CRTs for R, G and B.

20. A rear projection television system according to claim 16, wherein said projection source comprises a projection lens, an LCD controller and a light source.

* * * * *